US006865445B2

(12) United States Patent
Yamaguchi et al.

(10) Patent No.: US 6,865,445 B2
(45) Date of Patent: Mar. 8, 2005

(54) VENDING MACHINE WITH A VIBRATION SENSOR

(75) Inventors: Tomomi Yamaguchi, Isesaki (JP); Naoto Matsumoto, Isesaki (JP); Yoshiaki Inokuma, Seta-gun (JP); Akiyoshi Kosano, Sawa-gun (JP); Kazuyasu Ushigome, Isesaki (JP)

(73) Assignee: Sanden Corp., Gunma (JP)

( * ) Notice: Subject to any disclaimer, the term of this patent is extended or adjusted under 35 U.S.C. 154(b) by 0 days.

(21) Appl. No.: 10/690,599

(22) Filed: Oct. 23, 2003

(65) Prior Publication Data

US 2004/0079758 A1 Apr. 29, 2004

(30) Foreign Application Priority Data

Oct. 23, 2002 (JP) ...................................... 2002-307985

(51) Int. Cl.[7] ................................................ G06F 17/00

(52) U.S. Cl. .......................... 700/244; 700/232; 221/2; 221/191; 221/194

(58) Field of Search ................................ 700/231, 232, 700/236, 244; 221/2, 21, 191, 194, 255, 256

(56) References Cited

U.S. PATENT DOCUMENTS 2,956,660 A * 10/1960 Nordquist ................... 194/346
3,254,792 A * 6/1966 Danielson et al. ............ 221/14
3,348,733 A * 10/1967 Johnson ...................... 221/298
3,752,257 A * 8/1973 Davis .......................... 367/35
4,252,250 A * 2/1981 Toth ............................ 221/13
4,860,922 A * 8/1989 Malservisi et al. ............ 221/6
5,927,539 A * 7/1999 Truitt et al. ..................... 221/2
6,056,150 A * 5/2000 Kasper ........................ 221/21
6,360,140 B1 * 3/2002 Vidondo ..................... 700/236
6,478,187 B2 * 11/2002 Simson et al. ................ 221/75

FOREIGN PATENT DOCUMENTS

JP 05-135957 6/1993

* cited by examiner

*Primary Examiner*—Khoi H. Tran
(74) *Attorney, Agent, or Firm*—Banner & Witcoff, Ltd.

(57) ABSTRACT

When a coin(s) is inserted and an article selection button is further pressed, article carrying-out processing is started, and an article carrying-out device performs a carrying-out operation. An article is dropped and received in a receiving section by this carrying-out operation. When the article is received in the receiving section, the article collides with the receiving section, and vibrations are generated. The vibrations are detected by a vibration detection unit, and it is judged that the article is received in the receiving section. In the series of article carrying-out operations, when unexpected vibrations are applied to the receiving section after the article carrying-out processing is started, since a microcomputer excludes the vibrations, only vibrations at the time of receiving the article can be detected accurately.

13 Claims, 6 Drawing Sheets

VENDING MACHINE WITH A VIBRATION SENSOR

BACKGROUND OF THE INVENTION

1. Field of the Invention

The present invention relates to a vending machine for detecting vibrations of a receiving section to judge whether or not an article has been carried out.

2. Description of the Related Art

Conventionally, as this type of vending machine, there is known one described in Japanese Patent Laid-Open No. 6-348935.

When a customer purchases an article in the vending machine described in this laid-open application, he/she inserts a coin(s) and presses an article selection button. Consequently, a column of the article selected by the article selection button is selected, and an article carrying-out device set in the column is driven. As the article carrying-out device is driven, the selected article in the column is dropped to an article take-out opening and is carried out, and dropping vibrations of the article are generated at the article take-out opening. When a vibration sensor detects the dropping vibrations, the vending machine judges that carrying-out of the article has been completed, and a coin processing device performs a money receiving operation to lead the inserted coin(s) to a safe or the like. On the other hand, when vibrations are not detected, the vending machine returns the inserted coin(s) to the customer. Consequently, an inconvenience in that the inserted coin(s) is received in the safe or the like can be prevented.

In addition, as a vending machine of a type different from the one described in this laid-open application, there is a vending machine which stops driving of an article carrying-out device to shift to a sales standby state for the next sales article at a timing when a vibration sensor detects dropping vibrations of an article.

However, in the above-described two types of vending machines, it is likely malfunctions as described below occur if vibrations or impacts are applied to the vending machine from the outside when a customer purchases an article.

First, in the former vending machine, when unexpected vibrations are applied to the vending machine after the customer inserts a coin(s) and presses the article selection button, since the vibration sensor detects the vibrations, the inserted coin(s) is taken into the safe or the like before the carrying-out operation of the article is completed. In addition, in the latter vending machine, it is likely that the carrying-out operation of the article carrying-out device is stopped by the unexpected vibrations to cause a defect in carrying out the article.

SUMMARY OF THE INVENTION

In view of the above-described conventional problems, it is an object of the prevent invention to provide a vending machine which does not perform an article carrying-out operation or a money receiving operation by mistake even if unexpected vibrations or impacts are applied to the vending machine when a customer takes out an article.

A vending machine according to a first aspect of the present invention includes: an article carrying-out device which carries out an article; a receiving section in which the article carried out from the article carrying-out device is received; a vibration detection means which detects vibrations generated in the receiving section; and a judgment means which judges that the article is received in the receiving section on the basis of the vibrations detected by the vibration detection means and excludes vibrations detected in a time slot, in which vibrations due to carrying-out of an article cannot be generated, after the article carrying-out device is started among vibrations detected by the vibration detection means.

According to the first aspect of the present invention, when a coin(s) is inserted and an article selection button is further pressed, the article carrying-out processing is started and the article carrying-out device performs a carrying-out operation. Consequently, an article is carried out and is dropped to be received in the receiving section. When the article is received in the receiving section, the article collides with the receiving section, and vibrations generated by this collision are detected by the vibration detection means. The judgment means judges that the article is received in the receiving section according to the detected vibrations.

In this series of article carrying-out operations, even if unexpected vibrations are applied to the receiving section after the article carrying-out operation is started, the judgment means excludes the vibrations. As a result, the judgment means can detect only vibrations, which are generated when the article is dropped into the receiving section, accurately to judge the carrying-out of the article correctly.

A vending machine in accordance with a second aspect of the present invention includes: an article carrying-out device which carries out an article; a receiving section in which the article carried out from the article carrying-out device is received; a vibration detection means which detects vibrations generated in the receiving section; a judgment means which judges that the article is received in the receiving section on the basis of the vibrations detected by the vibration detection means; and a control means which controls the article carrying-out operation of the article carrying-out device to be prohibited for a predetermined time when vibrations are detected at least once by the vibration detection means at the time of standby for carrying out the article.

According to the vending machine in accordance with the second aspect of the present invention, when the vibration detection means has detected vibration during standby for carrying out the article, the article carrying-out operation of the article carrying-out device is prohibited for the predetermined time. That is, even if unexpected vibrations are applied at the standby time, since the article carrying-out operation of the article carrying-out device is not started until the vibrations end completely, it is less likely that unexpected vibrations are applied at the time of the article carrying-out operation, and malfunctions of the article carrying-out device are prevented.

A vending machine in accordance with a third aspect of the present invention includes: an article carrying-out device which carries out an article; a receiving section in which the article carried out from the article carrying-out device is received; a vibration detection means which detects vibrations generated in the receiving section; a judgment means which judges that the article is received in the receiving section on the basis of the vibrations detected by the vibration detection means and excludes vibrations detected in a time slot, in which vibrations due to carrying-out of an article cannot be generated, after the article carrying-out device is started among vibrations detected by the vibration detection means; and a control means which controls the article carrying-out operation of the article carrying-out device to be prohibited for a predetermined time when vibrations are detected at least once by the vibration detection means at the time of standby for carrying out the article.

According to the vending machine in accordance with the third aspect of the present invention, even at the time of both standby and the article carrying-out operation, unexpected vibrations are excluded or the article carrying-out operation is prohibited. Consequently, only vibrations, which are generated when a carried-out article collides with the receiving section, are detected, and malfunctions of the article carrying-out device are prevented surely.

The above-described object and other objects, characteristics, and benefits of the present invention will become apparent from the following description and the accompanying drawings.

DESCRIPTION OF THE PREFERRED EMBODIMENTS

Figure 1:
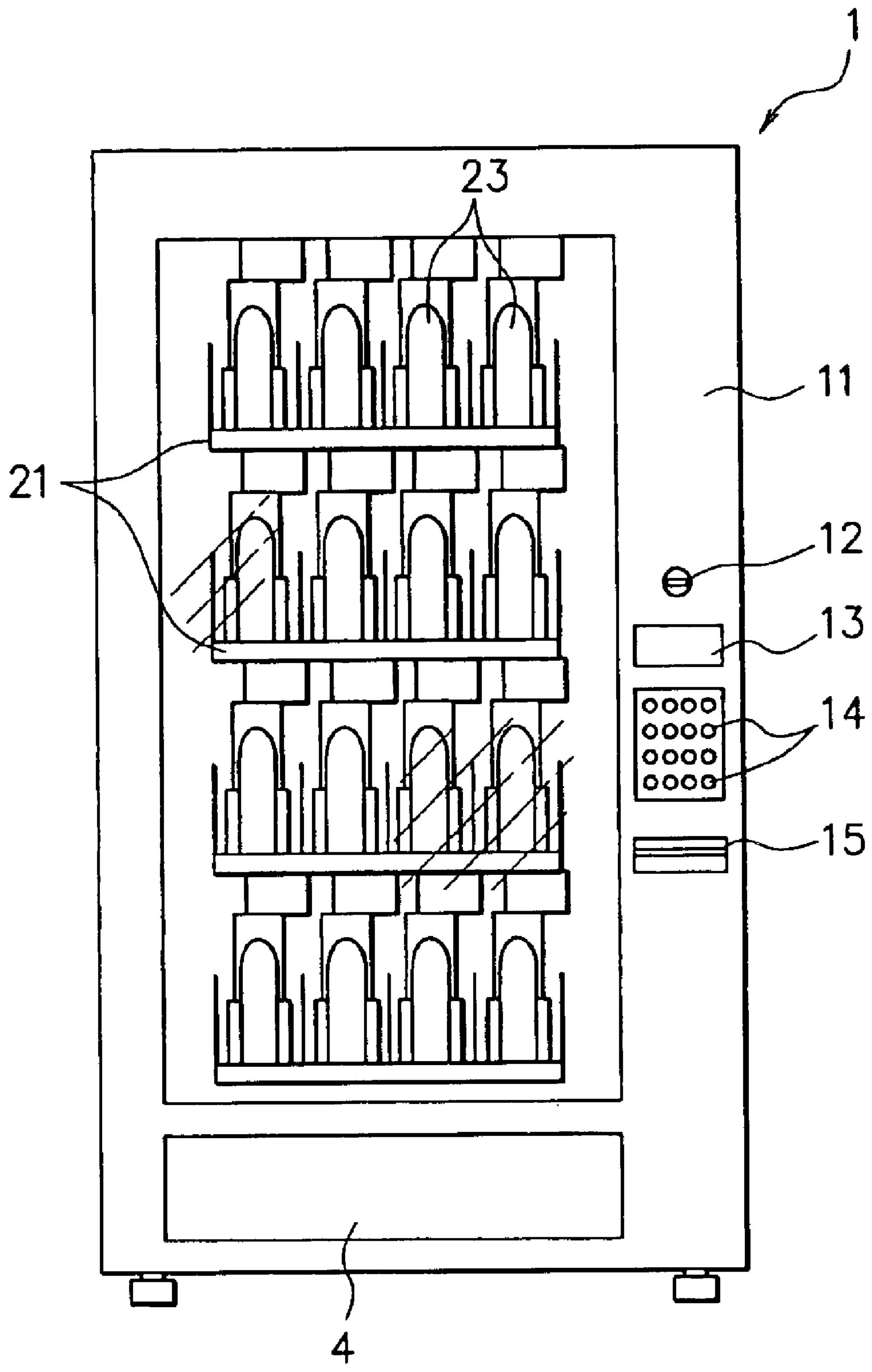
FIG. 1 is a front view showing a vending machine.

A schematic structure of a vending machine will be described with reference to FIGS. 1 and 2. In a front door 11 of this vending machine 1, there are provided a coin inserting port 12, an indicator 13 on which characters or the like is displayed by an LED, large number of article selection buttons 14 to be selected by a customer, a bill inserting port 15, and the like. In addition, article carrying-out devices 2, which are extended in a depth direction of the vending machine 1, are arranged in four rows horizontally and four stages vertically inside the vending machine 1. Articles A are mounted on an article shelf 21 of each article carrying-out device 2 in one row in the depth direction. A pushing-out mechanism 22, which pushes out all the articles A in the front direction through an article A1 at the rearmost part, is set above each article shelf 21. In addition, a stopper mechanism 23, which presses the article A2, is set in a front side of an article A2 at the foremost part.

Figure 2:
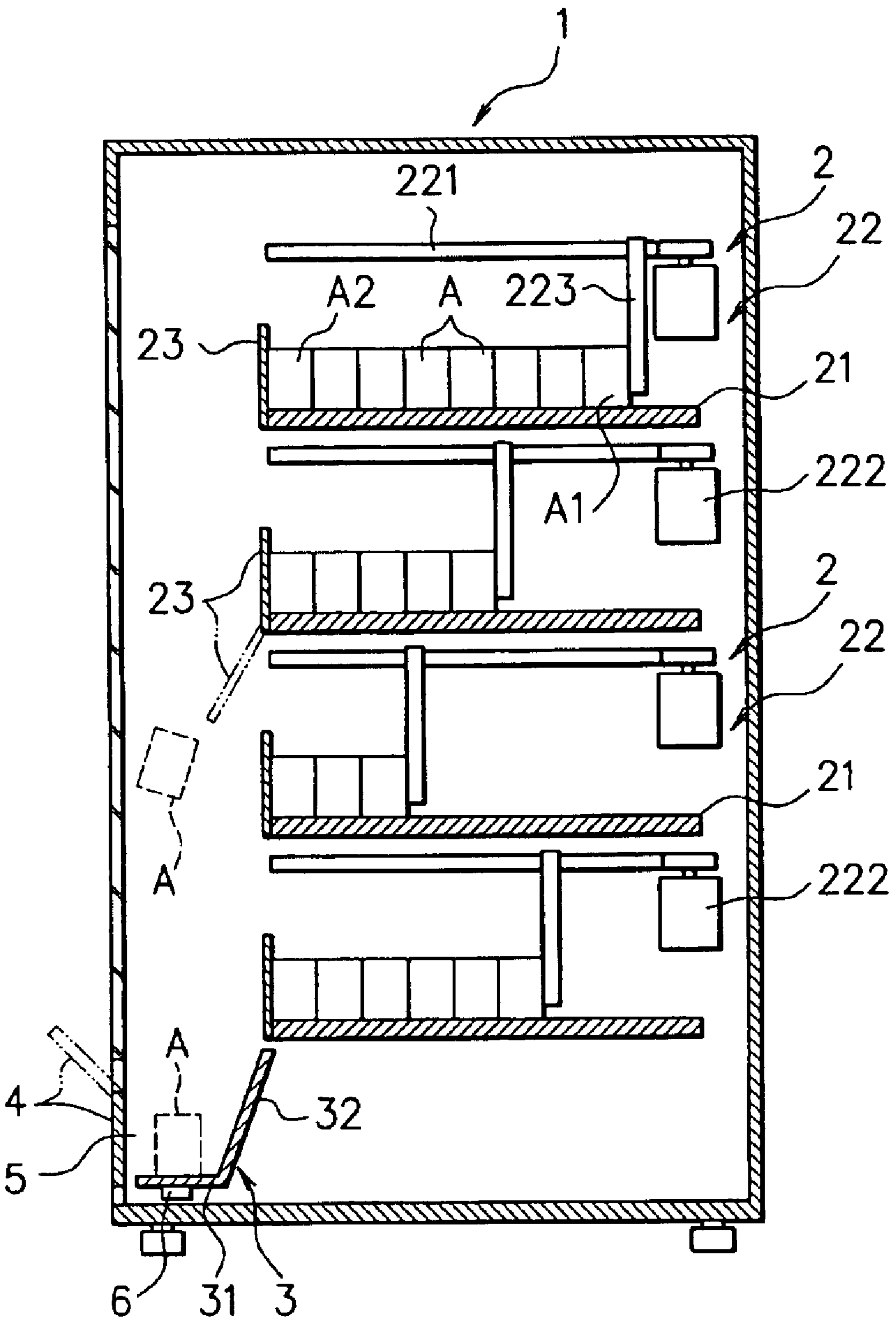
FIG. 2 is a schematic side view showing an internal structure of the vending machine.

As shown in FIG. 2, this pushing-out mechanism 22 has a timing belt 221 which is extended over the entire depth direction of this article shelf 21 above the article shelf 21, a motor 222 which rotates this timing belt 221, and a carrier 223 which is adhered to the timing belt 221. When the motor 222 is driven, the carrier 223 is moved forward to push out all the articles A in the forward direction.

The article A2 at the foremost part of the article shelf 21 pushes down the stopper mechanism 23 (the stopper mechanism 23 indicated by alternate long and two short dash lines) according to the pushing-out operation of the pushing-out mechanism 22, and the article A2 at the foremost part is dropped from the article shelf 21 and is carried out. This dropped and carried out article A is received in a receiving section (receiving plate 3). When a customer takes out the article A from the receiving plate 3, the customer opens a door 4 in front of the receiving plate 3, and the selected article A is sold from an article taking-out opening 5. In addition, a vibration sensor 6, which uses, for example, a piezoelectric element, is set on a lower surface of a bottom plate 31 of the receiving plate 3. This vibration sensor 6 is adapted to detect vibrations which are generated when the receiving plate 3 is hit with the article A.

Figure 3:
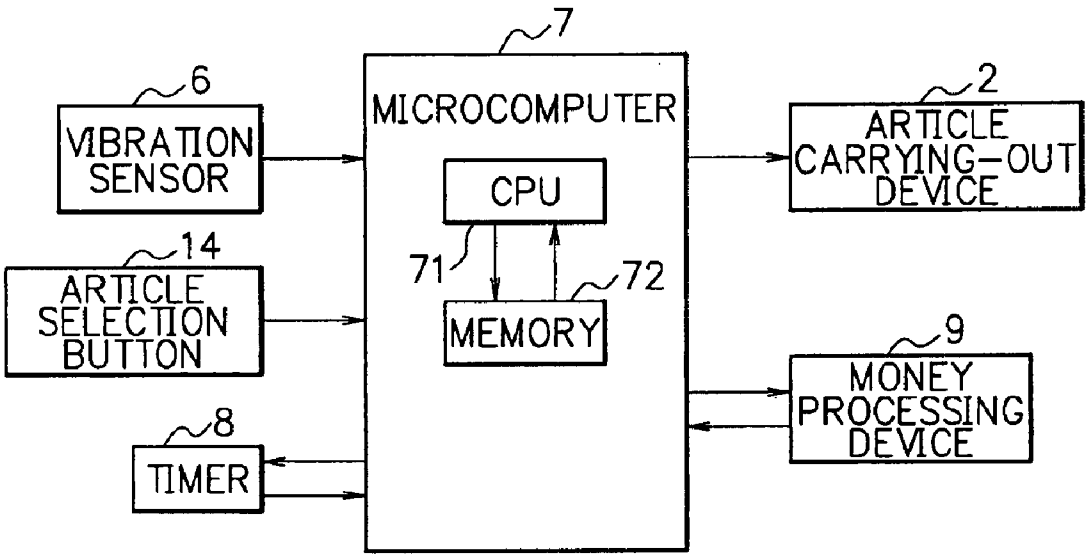
FIG. 3 is a block diagram showing a drive control circuit of a vending machine in accordance with a first embodiment.

In the vending machine provided with the constitution as described above, this embodiment has a structure for excluding vibrations other than vibrations following dropping of an article, that is, unexpected vibrations among vibrations generated during the article carrying-out operation, and judging that the article A is received in the receiving plate 3 on the basis of vibrations which are generated when the article A hits the receiving plate 3. This structure will be described with reference to a control block diagram of FIG. 3.

A microcomputer 7 is used as control means for the article carrying-out device 2 and the like. A CPU 71 of the microcomputer 7 includes judgment means which judges whether or not vibrations are generated in the receiving plate 3 on the basis of a vibration detection signal of the vibration sensor 6, judges which article A a purchaser of an article has selected with the article selection button 14, and judges whether or not a time counted by a timer 8 has reached a set time T1 or a set time T2.

Here, the set time T1 is set as a time slightly shorter than a time for completing carrying-out of an article. This time for completing carrying-out of an article is a time (e.g., one second), which is obtained from an empirical rule from the time when the article A is selected by the article selection button 14 until the time when the article A is dropped and hits the receiving plate 3 to generate vibrations. In addition, the set time T2 is set as a time equal to or slightly longer than the time for completing carrying-out of an article. Therefore, the set time T1 and the set time T2 are in a relation of $T1 \leqq T2$.

In addition, the CPU 71 is adapted to judge authenticity, an amount, or the like of money on the basis of a money signal from a money processing device 9 (corresponding to a coin processing device and a bill processing device). In addition, the CPU 71 serves as control means which instructs the money processing device 9 to perform a receiving operation or a refunding operation of inserted money when an article is received in the receiving plate 3. Moreover, the CPU 71 is adapted to control to drive the article carrying-out device 2 on the basis of a signal from the article selection button 14.

Note that, various data such as the set times T1 and T2 are stored in a memory 72, and the CPU 71 compares the data in the memory 72 and data from the vibration sensor 6 or the like to perform various kinds of judgment and control.

Figure 4:
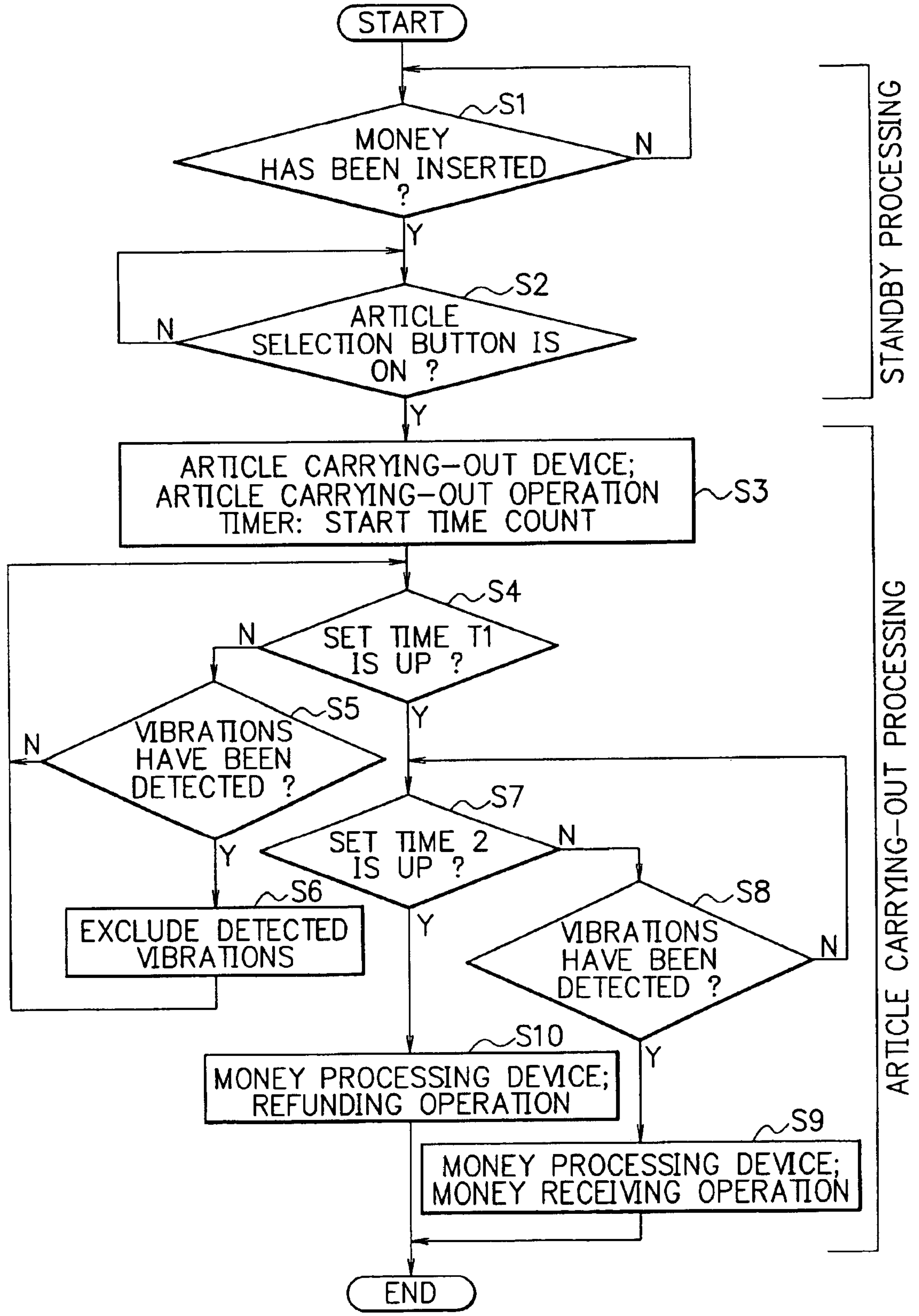
FIG. 4 is a control flowchart of the vending machine in accordance with the first embodiment.

Next, the judgment and control by the microcomputer 7 will be described with reference to a flowchart of FIG. 4.

The CPU 71 of the vending machine 1 watches whether or not money (coin or bill) has been inserted (S1) and also watches whether or not the article selection button 14 has been pressed (S2). These steps S1 and S2 are a standby processing state of article sales.

In these steps S1 and S2, when money (a coin(s) in an amount equal to or more than a selected article price) is inserted and the article selection button 14 is pressed, article carrying-out processing is started. In this article carrying-out processing, first, the article carrying-out device 2 is driven to perform an article carrying-out operation and, on the other hand, the timer 8 starts time count (S3). Subsequently, the CPU 71 watches whether or not the set time T1 has elapsed (S4). The CPU 71 watches whether or not the vibration sensor 6 has detected unexpected vibrations (vibration not following dropping and carrying-out of the article A) during this set time T1 (during the article carrying-out operation) (S5) and, when unexpected vibration has been detected, the CPU 71 excludes the vibrations.

When the set time T1 has elapsed, the CPU 71 watches whether or not the set time T2 has elapsed (S7) and further watches whether or not vibrations have been detected during the set time T2 (S8). Here, when vibrations have been detected, the CPU 71 judges that the article A has been dropped and carried out to the receiving plate 3 and the carrying-out of article has been completed, and instructs the money processing device 9 to perform an operation for receiving the inserted money (S9). When vibrations have not been detected during the set time T2, the CPU 71 instructs the money processing device 9 to perform the refunding operation of the inserted money (S10).

As described above, according to the first embodiment, the CPU 71 watches whether or not unexpected vibrations have been generated over the set time T1 after the article carrying-out operation was started. Then, when the vibrations have been generated, the CPU 71 judges that the vibrations are not vibrations which are generated when the article A is received in the receiving plate 3. As a result, an inconvenience in that the money processing device 9 performs the money receiving operation according to unexpected vibrations is prevented.

Note that, although not shown in the figure, when a constitution for stopping the article carrying-out device 2 when the vibration sensor 6 has detected vibrations is adopted, the article carrying-out device 2 is not stopped according to detection of vibrations in step S5 but is stopped according to detection of vibrations in step S8. Therefore, the article A is carried out surely.

Figure 5:
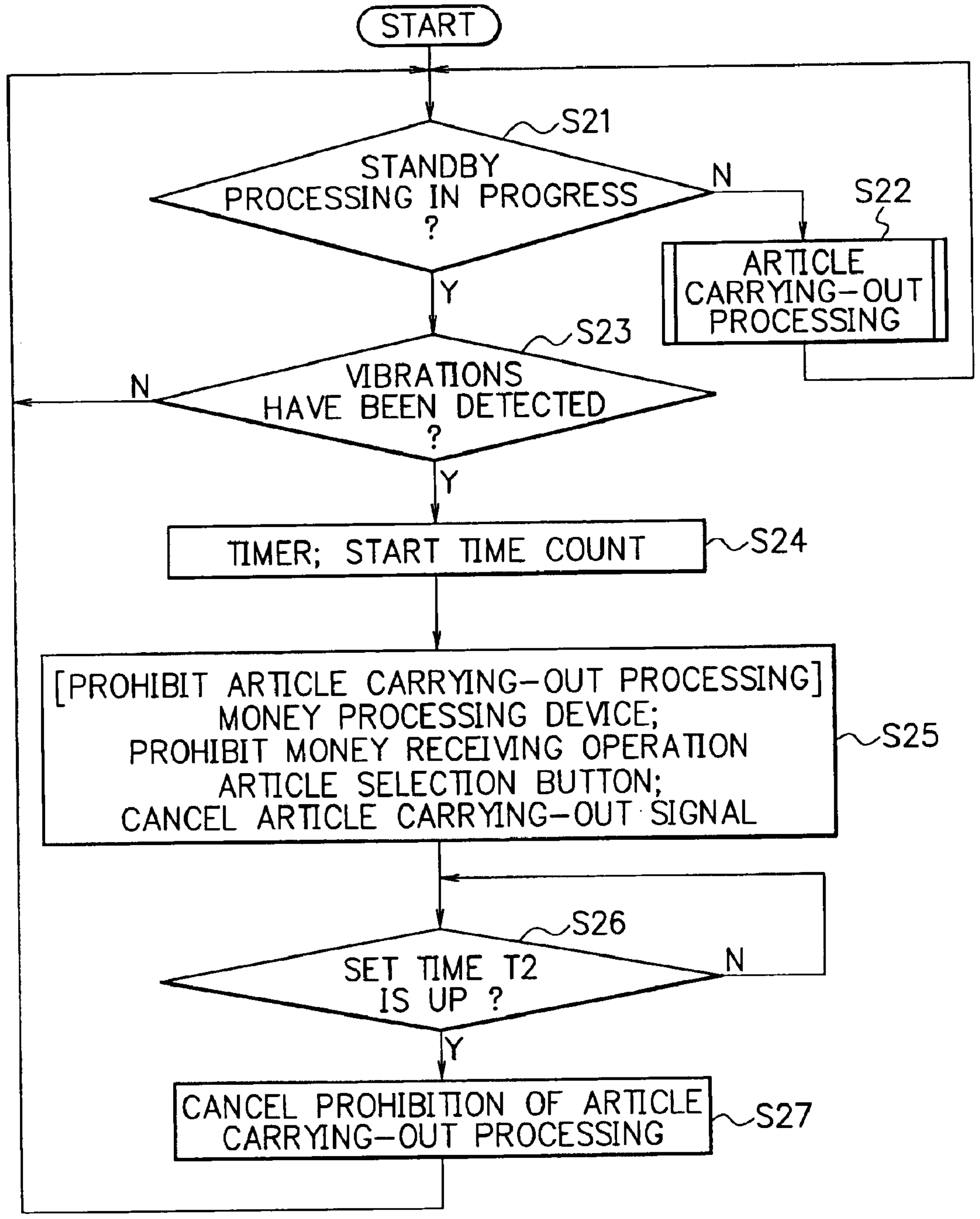
FIG. 5 is a control flowchart of a vending machine in accordance with a second embodiment of the present invention.

A control flowchart of FIG. 5 shows a second embodiment of a vending machine. Note that, since the vending machine in accordance with the second embodiment has a structure identical with that shown in FIGS. 1 to 3, a description of the structure will be omitted.

The first embodiment shows control in the case in which unexpected vibrations are detected after the article carrying-out processing is started. On the other hand, the second embodiment shows control in the case in which unexpected vibrations are detected at the time of standby for carrying out an article.

First, the CPU 71 watches whether or not standby processing for carrying out an article is in progress. That is, as described above, the CPU 71 watches whether or not money has been inserted and also watches whether or not the article section button 14 has been pressed (S21) (see FIG. 4). Here, when the standby processing is not in progress, that is, the article carrying-out processing is in progress, the CPU 71 performs the article carrying-out processing (S22). This article carrying-out processing is the same as steps S3 to S10 shown in the above-described first embodiment.

On the other hand, when the standby processing is in progress in step 21, the CPU 71 watches whether or not vibrations have been detected (S23). Here, when unexpected vibrations (vibrations not following dropping and carrying-out of the article A) are detected, the timer 8 starts time count (S24), and the CPU 71 prohibits the article carrying-out processing (S25). That is, the CPU 71 prohibits the money receiving operation of the money processing device 9. More specifically, when a bill(s) is inserted from the bill inserting port 15, the CPU 71 returns the bill(s). In addition, when a coin(s) is inserted from the coin inserting port 12, the money processing device 9 is controlled to return the inserted coin(s) to a not-shown return port directly. Further, when unexpected vibrations are detected after insertion of money, the CPU 71 cancels an article carrying-out signal. More specifically, the CPU 71 controls the article carrying-out device 2 not to be driven. Such prohibition control is performed over the set time T2 (S26). Then, when the set time T2 has elapsed, the CPU 71 cancels the prohibition control of the article carrying-out processing and stands by (S27). That is, when the set time T2 has elapsed, insertion of money becomes possible, and the article carrying-out device 2 can be driven in accordance with a pressing operation of the article selection button 14.

As described above, according to the second embodiment, since the article carrying-out processing is prohibited when unexpected vibrations are applied during the standby processing, an inconvenience in that the money processing device 9 performs the money receiving operation according to this vibration detection is prevented.

In addition, step S22 of the second embodiment corresponds to the control of steps S3 to S10 of the first embodiment. However, the steps of the second embodiment except step S22 can be applied to a conventional vending machine with the same structure.

The conventional vending machine has a structure for operating the money processing device 9 and the article carrying-out device 2 even in the case in which unexpected vibrations are detected during the article carrying-out processing. Steps S21 and S23 to S27 of the second embodiment are applied to this conventional vending machine.

According to the conventional vending machine to which steps S21 and S23 to S27 are applied, when vibrations are detected during the standby processing, the article carrying-out processing can be delayed. Therefore, there is an effect that generation of unexpected vibration after starting the article carrying-out processing can be prevented.

Figure 6:
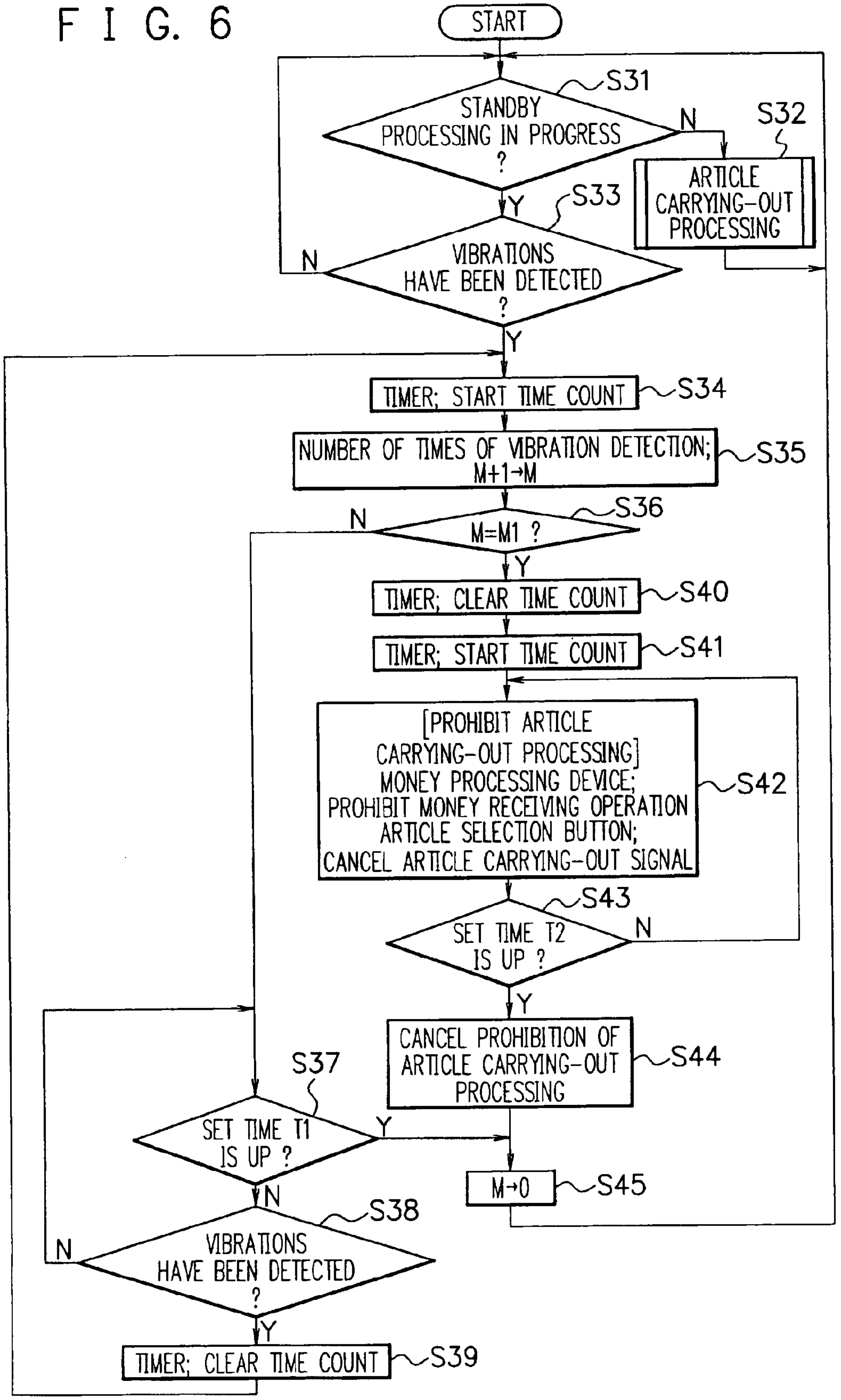
FIG. 6 is a control flowchart of a vending machine in accordance with a third embodiment of the present invention.

A control flowchart of FIG. 6 shows a third embodiment of a vending machine. Note that, since the vending machine in accordance with the third embodiment has a structure identical with that shown in FIGS. 1 to 3, a description of the structure will be omitted.

The first embodiment shows control in the case in which unexpected vibrations are detected after the article carrying-out processing is started. On the other hand, the third embodiment shows control in the case in which unexpected vibrations are detected for plural times at the time of standby for carrying out an article.

First, the CPU 71 watches whether or not the standby processing for carrying out an article is in progress. That is, as described above, the CPU 71 watches whether or not money has been inputted and also watches whether or not the article selection button 14 has been pressed (S31) (see FIG. 4). Here, when the standby processing is not in progress, that is, the article carrying-out processing is in progress, the CPU 71 performs the article carrying-out processing (S32). This article carrying-out processing is the same as steps S3 to S10 shown in the first embodiment.

On the other hand, when the standby processing is in progress in step S31, the CPU 71 watches whether or not vibrations have been detected (S33). Here, when unexpected vibrations (vibrations not following dropping and carrying-out of the article A) are detected, the timer 8 starts time count (S34). Then, the CPU 71 adds "1" to the number of times of detection M of the vibrations to update the number of times of detection (S35). The CPU 71 judges whether or not this updated number of times of vibration detection M has become equal to the set number of times of vibration detection M1 (M1 is set to be equal to or more than "2")(S36). Here, when M is not equal to M1 (when the number of times of vibration detection M has not reached the set number of times of vibration detection M1), the CPU 71 watches whether or not there are vibrations continuing thereafter until the set time T1 is reached (S37, S38). When there are following vibrations, the CPU 71 clears the time count of the timer 8 (S39), and then returns to step S34 to start the time count of the timer 8 again, and judges whether or not the number of times of vibration detection M has reached the set number of times of vibration detection M1 in steps S35 and S36 again.

As described above, during the standby processing, vibrations are generated plural times at an interval shorter than a time interval of the set time T1, and it is always watched whether or not the number of times of detection M of the plural times of vibrations has reached the set number of times of vibration detection M1.

When M is equal to M1 in step S36, the CPU 71 clears the time count of the timer 8 (S40) and starts the time count of the timer 8 again (S41). The CPU 71 prohibits the article carrying-out processing according to the resumption of the time count of the timer 8 (S42). That is, the CPU 71 prohibits the money receiving operation of the money processing device 9. More specifically, when a bill(s) is inserted from the bill inserting port 15, the CPU 71 returns the bill(s). In addition, when a coin(s) is inserted from the coin inserting port 12, the money processing device 9 is controlled to return the inserted coin(s) to a not-shown return port directly. Further, when unexpected vibrations are detected after insertion of money, the CPU 71 cancels an article carrying-out signal. More specifically, the CPU 71 controls the article carrying-out device 2 not to be driven. Such prohibition control is performed over the set time T2 (S43). Then, when the set time T2 has elapsed, the CPU 71 cancels the prohibition control of the article carrying-out processing and stands by (S44). That is, when the set time T2 has elapsed, insertion of money becomes possible, and the article carrying-out device 2 can be driven in accordance with a pressing operation of the article selection button 14.

When the prohibition control of the article carrying-out processing and the cancellation processing thereof have ended, the CPU 71 clears the number of times of vibration detection M added up to that point and returns it to "0" (S45), and returns the processing to the initial state of step S31.

According to this embodiment, since the article carrying-out processing is prohibited when unexpected vibrations are applied for plural times during the standby processing, an inconvenience in that the money processing device 9 performs the money receiving operation according to this vibration detection is prevented.

In addition, step S32 of the third embodiment corresponds to the control of steps S3 to S10 of the first embodiment. However, the steps of the third embodiment except step S32 can be applied to a conventional vending machine with the same structure.

The conventional vending machine has a structure for operating the money processing device 9 and the article carrying-out device 2 even in the case in which unexpected vibrations are detected during the article carrying-out processing. Steps S31 and S33 to S45 of the third embodiment are applied to this conventional vending machine.

According to the conventional vending machine to which steps S31 and S33 to S45 are applied, when vibrations are frequently detected during the standby processing, in other words, when probability of unexpected vibrations being applied during the article carrying-out operation is high, the article carrying-out processing can be delayed. Therefore, there is an effect that generation of unexpected vibration after starting the article carrying-out processing can be prevented.

What is claimed is:

1. A vending machine comprising:

an article carrying-out device which carries out an article;

a receiving section in which the article carried out from said article carrying-out device is received;

a vibration detection means which detects vibrations generated in said receiving section; and a judgment means which judges that the article is received in said receiving section on the basis of the vibrations detected by said vibration detection means and excludes vibrations detected in a time slot, in which vibrations due to carrying-out of an article cannot be generated, after said article carrying-out device is started among vibrations detected by said vibration detection means.

2. A vending machine comprising:

an article carrying-out device which carries out an article;

a receiving section in which the article carried out from said article carrying-out device is received;

a vibration detection means which detects vibrations generated in said receiving section;

a judgment means which judges that the article is received in said receiving section on the basis of the vibrations detected by said vibration detection means; and a control means which controls the article carrying-out operation of said article carrying-out device to be prohibited for a predetermined time when vibrations are detected at least once by said vibration detection means at the time of standby for carrying out the article.

3. A vending machine comprising:

an article carrying-out device which carries out an article;

a receiving section in which the article carried out from said article carrying-out device is received;

a vibration detection means which detects vibrations generated in said receiving section;

a judgment means which judges that the article is received in said receiving section on the basis of the vibrations detected by said vibration detection means and excludes vibrations detected in a time slot, in which vibrations due to carrying-out of an article cannot be generated, after said article carrying-out device is started among vibrations detected by said vibration detection means; and a control means which controls the article carrying-out operation of said article carrying-out device to be prohibited for a predetermined time when vibrations are detected at least once by said vibration detection means at the time of standby for carrying out the article.

4. The vending machine according to claim 2, wherein the vibrations detected by said vibration detection means are vibrations detected intermittently twice or more.

5. The vending machine according to claim 3, wherein the vibrations detected by said vibration detection means are vibrations detected intermittently twice or more.

6. The vending machine according to claim 4, wherein a time interval of the vibrations is a time interval shorter than a time in which the article carrying-out operation is completed.

7. The vending machine according to claim 5, wherein a time interval of the vibrations is a time interval shorter than a time in which the article carrying-out operation is completed.

8. The vending machine according to claim 2, wherein the predetermined time, in which the article carrying-out operation of said article carrying-out device is prohibited, is set substantially equal to or slightly longer than a time required for carrying out one article.

9. The vending machine according to claim 3, wherein the predetermined time, in which the article carrying-out operation of said article carrying-out device is prohibited, is set substantially equal to or slightly longer than a time required for carrying out one article.

10. The vending machine according to claim 4, wherein the predetermined time, in which the article carrying-out operation of said article carrying-out device is prohibited, is set substantially equal to or slightly longer than a time required for carrying out one article.

11. The vending machine according to claim 5, wherein the predetermined time, in which the article carrying-out operation of said article carrying-out device is prohibited, is set substantially equal to or slightly longer than a time required for carrying out one article.

12. The vending machine according to claim 6, wherein the predetermined time, in which the article carrying-out operation of said article carrying-out device is prohibited, is set substantially equal to or slightly longer than a time required for carrying out one article.

13. The vending machine according to claim 7, wherein the predetermined time, in which the article carrying-out operation of said article carrying-out device is prohibited, is set substantially equal to or slightly longer than a time required for carrying out one article.

* * * * *